United States Patent [19]

Darnell et al.

[11] Patent Number: 4,623,675
[45] Date of Patent: Nov. 18, 1986

[54] AROMATIC POLY(ETHER-CARBONATE) CONTAINING ETHYLENEOXY AND ARYLENE OXY MOIETIES

[75] Inventors: William R. Darnell; Winston J. Jackson, Jr., both of Kingsport, Tenn.

[73] Assignee: Eastman Kodak Company, Rochester, N.Y.

[21] Appl. No.: 760,801

[22] Filed: Jul. 31, 1985

[51] Int. Cl.$^4$ ............................................. C08G 63/62
[52] U.S. Cl. ..................................... 521/180; 521/90; 525/462; 528/196; 528/204
[58] Field of Search ................ 525/462; 528/196, 204; 521/180, 90

[56] References Cited

U.S. PATENT DOCUMENTS

| | | | |
|---|---|---|---|
| 2,799,666 | 7/1957 | Caldwell | 528/196 |
| 3,069,385 | 12/1962 | Stevens | 528/196 |
| 3,250,744 | 5/1966 | Schnell et al. | 528/196 |
| 4,160,791 | 7/1979 | Higley et al. | 528/196 |

Primary Examiner—Harold D. Anderson
Attorney, Agent, or Firm—John F. Stevens; William P. Heath, Jr.

[57] ABSTRACT

Disclosed are new poly(ether-carbonates) which may be prepared by heating aromatic diol polycarbonates with ethylene carbonate, optionally in the presence of a suitable catalyst or promoter.

4 Claims, No Drawings

AROMATIC POLY(ETHER-CARBONATE) CONTAINING ETHYLENEOXY AND ARYLENE OXY MOIETIES

DESCRIPTION

1. Technical Field

This invention relates to new poly(ether-carbonates) and their preparation by heating aromatic diol polycarbonates with ethylene carbonate, optionally in the presence of a suitable catalyst or promoter.

2. Background of the Invention

Poly(ether-carbonates) have long been prepared by melt polymerization of monomers, which already contained ether linkages, with diphenyl carbonate. Such monomers are generally prepared by reacting ethylene oxide in the presence of a catalyst with a monomeric material containing one or more aromatic hydroxyl groups. The hydroxyl groups are converted to hydroxyethoxyl groups, and thus the monomers containing intraether groups are obtained. During the preparation of the monomer containing the intraether linkages, it is very difficult to carry out the reaction without converting all of the hydroxyl groups to hydroxyethoxyl groups and without some additional reaction with the hydroxyethoxyl groups to form short poly(ethylene oxide) linkages.

The monomers containing intraether groups may be polymerized or copolymerized in the melt with, for example, diphenyl carbonate to form poly(ether-carbonates) by conventional procedures. Solution polymerization of these monomers with, for example, phosgene or bis(chlorocarbonate) esters of diols, to prepare poly(ether-carbonates) gives products of relatively low molecular weight.

U.S. Pat. No. 2,628,945 discloses the foaming of fusible, organic macromolecular polymers using ethylene carbonate as a foaming agent. U.S. Pat. No. 3,224,983 discloses the foaming of synthetic thermoplastic polymers containing cyclic carbonate moieties, either chemically combined or admixed in the polymer, by heating in the presence of an "activator."

The preparation of poly(ether-carbonates) by reactng the bis(hydroxyethyl) ethers of aromatic diols with, for example, diphenyl carbonate (and, in some cases, an added diol to prepare copolymers) is well known to those skilled in the art. A homopoly(ether-carbonate) prepared by this method would have the following structure:

$$\mathrm{-\!\!\left[OCH_2-CH_2-OAr-O-CH_2CH_2-O-\overset{O}{\overset{\|}{C}}\right]_{\!\!x}\!\!-} \quad (A)$$

We are aware of no art which discloses the preparation of poly(ether-carbonate) homo- or copolymers from the monohydroxyethyl ether of an aromatic diol. Such a polymer would have the following structure:

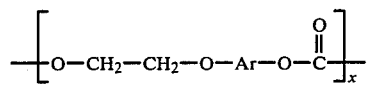

Aqueous alkaline hydrolysis of polymers and analysis of the hydrolysate by gas chromatography is a good method for determining the structure of polymeric materials. When structure (A) is hydrolyzed, the following diol specie is found:

$$\mathrm{HO-CH_2-CH_2O-Ar-O-CH_2CH_2OH}$$

Aqueous alkaline hydrolysis and chromatographic analysis of the hydrolysate of the poly(ether-carbonates) of this invention indicate a mixture of diol moieties are present. For example, when equimolar (one mole/repeat unit) amounts of cyclic ethylene carbonate and bisphenol A polycarbonate are reacted according to the process of this invention, and the polymeric product is hydrolyzed and analyzed by gas chromatography, the diol moieties found are:

| Diol Specie | Mole % (GC) |
|---|---|
| HO—⟨Ar⟩—OH | 35.6 |
| HO—⟨Ar⟩—O—CH$_2$CH$_2$OH | 49.9 |
| HO—CH$_2$CH$_2$—O—⟨Ar⟩—O—CH$_2$CH$_2$OH | 14.5 |

The present invention provides new poly(ether-carbonate) compositions. The present invention also provides a process for preparing the new poly(ether-carbonates) and a process for foaming aromatic diol polycarbonates. The objects of the invention are accomplished by heating an aromatic diol poly-carbonate with ethylene carbonate at about 160° C. up to about 300° C. (partial pressurization required to prevent loss of ethylene carbonate at high temperature) for up to 5–6 hours, optionally in the presence of a suitable catalyst. The reaction may be represented as follows:

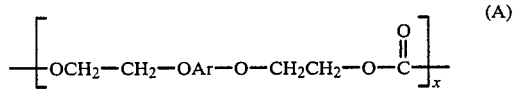

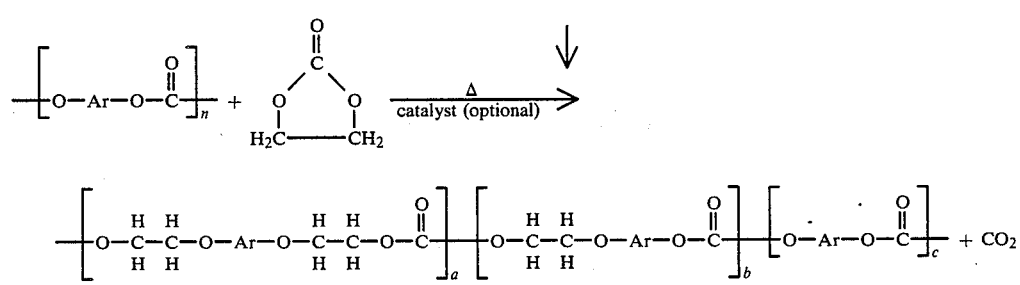

wherein $a+b+c=n$ and are not blocked as depicted but are randomly repeated and "Ar" is defined as the aromatic radical remaining after removal of the hydroxyl groups from an aromatic diol.

DESCRIPTION OF THE INVENTION

According to the present invention, there is provided a composition of matter comprising repeating units of:

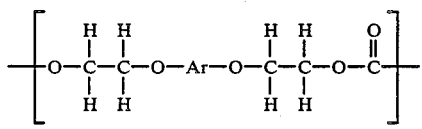 (1)

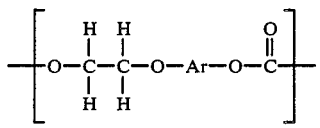 (2)

and

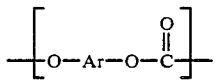 (3)

such as to result in an I.V. of about 0.05–2.00 of said composition and Ar is aryl having 6–30 carbon atoms.

This invention also provides foamed structures, films, and fibers comprising the composition described above. The new compositions of this invention provide molded products of improved stiffness, higher elongation, and processability is improved due to lower melting temperatures.

In the composition described structurally above, a, b, and c are at least 1 and usually 2 or more. The integers a, b, and c may range upwardly to result in molecular weights of processable compositions. When a, b, and c are too large, the compositions are not processable, because the molecular weights are so high as not to permit melting or dissolving. When a, b, and c are small, i.e., about 1, the compositions are useful as polyols for forming coating compositions The terminal groups are hydroxyl groups.

The I.V. (inherent viscosity) of the compositions may range from about 0.05 to about 2.00, preferably about 0.1 to about 0.7.

Ar may be substituted or unsubstituted. Conventional substituents may be used, e.g., alkylene, alkyl, aralkyl, or aryl group of 1 to 24 carbon atoms, halogen, etc.

The poly(ether-carbonates) of the invention are prepared by heating a mixture of an aromatic (as defined above) diol polycarbonate or copolycarbonate with ethylene carbonate at about 160° C. up to about 300° C. for a few seconds to 2–3 hours or more, depending on the molar ratio of ethylene carbonate/polycarbonate, the melting or flow point of the polycarbonate, the thermal stability of the polycarbonate, and the circumstances or method of carrying out the reaction. The molar ratio of ethylene carbonate:polycarbonate may be about 0.005–1.9:1. However, where a foamed product is to be made, the ratio should be about 0.005–0.04:1. Excess ethylene carbonate (above 1.9:1 up to about 5:1) may be used in the process, but the excess ethylene carbonate above the 1.9:1 ratio must be removed, such as by vacuum distillation, before polymerization is completed. The excess ethylene carbonate in such a case would act as a solvent. Higher molar ratios require shorter reaction times. If the melting or flow point of the polycarbonate is high, obviously larger reaction times will be required unless the reaction temperature is increased. Optionally, a catalyst may be added to increase the rate of the reaction. The reaction is usually carried out at or slightly below the boiling point of ethylene carbonate (248° C.), but the reaction may be carried out at higher temperatures under pressure to prevent loss of ethylene carbonate. In general, the time of reaction varies indirectly with the molar ratio of ethylene carbonate/polycarbonate and the reaction temperature. The reaction may be carried out in a batch or continuous reactor (used with higher molar ratios of ethylene carbonate/polycarbonate in which a foamed product is not desired), an extruder (for extruded shapes in which the carbon dioxide by-product of the reaction is utilized as a blowing agent), or an injection molding machine (for molded shapes in which the carbon dioxide by-product of the reaction is utilized as the blowing agent). Conventional extrusion-foaming and foam molding equipment may be used. Generally, extrusion foaming and foam molding operations are carried out at relatively low molar ratios of ethylene carbonate/polycarbonate (about 0.005 to about 0.04), since the amount of by-product carbon dioxide needed for these processes is small. Density reductions of 40–50% or more can be achieved at molar ratios of about 0.01/1–0.02/1.

For those instances in which an unfoamed product is desired, the reaction is carried out in a batch or continuous reactor under conditions which will allow the by-product carbon dioxide to escape without causing the reaction mixture to foam out of the reactor. Generally, the reaction is carried out until the theoretical volume of carbon dioxide has been evolved, and vacuum is applied for a short period to remove volatile materials. If the presence of small amounts of volatiles is acceptable, application of vacuum is not required to obtain useful poly(ether-carbonates).

Since the rate of reaction is considerably dependent on the molar ratio of ethylene carbonate/polycarbonate (faster rates at higher ratios), it is at times advantageous to begin the reaction at a higher than desired molar ratio of ethylene carbonate/polycarbonate and apply vacuum to remove the excess ethylene carbonate when the desired theoretical volume of carbon dioxide has been evolved. This is especially true when polycarbonates having high flow points or excessively high melt viscosities are utilized in the reaction. In such cases, molar ratios of up to 5 or more may be used in the starting reactants, but the ratio in the polymeric mixture must be no greater than 1.9:1 (ethyleneoxy: repeat unit of aromatic diol). The poly(ether-carbonate) compositions of the invention contain 0.005–1.9 moles of ethyleneoxy (—O—CH$_2$—CH$_2$—) per repeat unit of aromatic diol polycarbonate. The poly(ether-carbonates) containing the low levels of ethyleneoxy are usually foamed compositions.

Although the reaction proceeds readily in the absence of added catalyst, it may at times be advantageous to add a catalyst or promoter to the reaction to increase the rate of reaction, particularly at relatively low molar ratios of ethylene carbonate/polycarbonate. Suitable catalysts and promoters include tertiary amines, quaternary ammonium and phosphonium salts, alkali metal salts, and compounds or polymers containing at least one unsubstituted amide hydrogen atom:

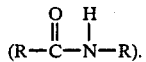

Aromatic diol polycarbonates which may be used to prepare the new compositions of the invention include all aromatic diol polycarbonates or copolycarbonates which are sufficiently thermally stable to withstand the conditions of the reaction and which are molten or substantially dissolved during the process. Aromatic diol, in this case, refers to any moiety to which are attached, directly to an aromatic ring, two hydroxyl groups. The hydroxyl groups may be on the same or different rings. The preferred polycarbonate is bisphenol A polycarbonate. The aromatic diol polycarbonates may be high or low I.V. The I.V. of the final polymer is usually somewhat lower than that of the aromatic diol polycarbonate. The I.V. of the aromatic diol polycarbonate should be about 0.05–0.2 if the poly(ether carbonate) product is to be used on a polyol. If the poly(ether carbonate) product is to be used as a molding plastic, the I.V. of the aromatic diol polycarbonate should be greater than 0.2, and preferably greater than 0.5.

The poly(ether-carbonate) compositions of the invention preferably have I.V.'s of at least about 0.3. The new poly(ether-carbonates) of the invention have utility as fibers, molding plastics, and films. They exhibit improved processability (due to depression of the glass transition temperature) while maintaining high flexural moduli, relative to their aromatic diol polycarbonate precursors.

If desired, inert additives such as nucleating agents may be added before reaction of the ethylene carbonate with the aromatic diol polycarbonate, particularly when the poly(ether-carbonate) is to be extrusion foamed or foam molded.

The following examples are submitted for a better understanding of the invention. Inherent viscosities of the polymers are determined at 25° C. in a 40/36/24 weight mixture of p-chlorophenol/phenol/1,1,2,2-tetrachloroethane at a concentration of 0.1 g/100 mL. Films are pressed in a Hannafin press at 10°–30° C. above the melting or flow point of the poly(ether-carbonate). H NMR data are obtained with a JEOL JNM-MH-100 nuclear magnetic spectrometer using d-trifluoroacetic acid as a solvent. Foamed moldings are carried out in a Newbury molding machine by the "short-shot" procedure, and unfoamed moldings are carried out in a Watson-Stillman (⅛-ounce) molding machine. For gas chromatographic analysis, the samples are first hydrolyzed in 1N KOH in n-propanol. The hydrolysate is then silated and separated on a column containing 10% silicone F-50 at 100°–240° C. Glass transition temperatures (Tg's) are determined with a Perkin-Elmer DSC-2 differential scanning calorimeter. For determining the properties of molded specimens, ASTM D638 is used for tensile properties, ASTM D790 is used for flexural properties, and ASTM D955 is used for heat-deflection temperature.

EXAMPLE 1

This example illustrates the preparation and molding plastic properties of a poly(ether-carbonate) prepared from ethylene carbonate/bisphenol A polycarbonate at a starting molar ratio of 1/1.

Into a 500-mL, three-necked flask equipped with metal stirrer, provisions for maintaining a nitrogen atmosphere and applying vacuum, and a wet test meter to measure the volume of gas evolved are placed 139.7 g (0.55 mol) bisphenol A polycarbonate, I.V. 0.64, and 48.4 g (0.55 mol) of distilled cyclic ethylene carbonate. After being purged three times with nitrogen, the contents of the flask are dried in a 100° C. metal bath for 30 minutes at 10 torr. The flask is then heated in a metal bath at 250° C. for 45 minutes with slow stirring. During this time, the reaction mixture becomes homogeneous, a light yellow color forms, and 0.082 ft³ of gas is liberated. The metal bath temperature is then raised to 260° C. for 80 minutes. At this time, the total amount of gas liberated is 0.285 ft³ The metal bath temperature is further increased to 275° C. for 150 minutes, and the total amount of liberated gas is now 0.388 ft³, or 0.43 mol of $CO_2$. Vacuum is then applied to the stirred flask during about five minutes to <0.5 torr, and the reaction is stirred at this temperature and pressure for 15 minutes and cooled. The hot polymer is transparent, light yellow, has a moderate melt viscosity, and weighs 160.1 g. The poly(ether-carbonate) has an I.V. of 0.61 and a Tg of 104° C. By NMR, the molar ratio of ethyleneoxy/bisphenol A units in the poly(ether-carbonate) is 0.8/1. Hydrolysis of the poly(ether-carbonate) product and analysis of the hydrolysate by gas chromatography indicates the following diol moieties and concentrations are present in the poly(ether-carbonate):

| Diol Moiety | Mole % |
|---|---|
| HO—⟨⟩—⟨⟩—OH | 36.0 |
| HO—⟨⟩—⟨⟩—O—CH₂CH₂OH | 50.2 |
| HO—CH₂CH₂—O—⟨⟩—⟨⟩—O—CH₂CH₂OH | 13.8 |

The poly(ether-carbonate) is then Wiley-milled through a ¼-inch screen, vacuum dried at 80° C. overnight, and injection molded at 260° C./900 psig in a Watson-Stillman molding machine (⅛-ounce). The molded bars are transparent and light yellow. A sample of the bisphenol A polycarbonate which was used to prepare the poly(ether-carbonate) is also molded as a control at 290° C./1200 psig. Comparative properties are given below.

| Property | Polycarbonate Control | Poly(ether carbonate) |
|---|---|---|
| Tensile strength, psi | 11,370 | 9,350 |
| Elongation at Break, % | 77 | 109 |
| Flexural Strength, psi | 13,480 | 15,420 |
| Flexural Modulus, psi | 336,000 | 406,000 |
| Heat Deflection Temperature, °C., 264 psi | 129 | 87 |

EXAMPLE 2

This example illustrates the preparation of the Example 1 poly(ether-carbonate) without the application of vacuum.

Example 1 is repeated except the reaction is stopped after five hours total heating without vacuum. The melt viscosity of the reaction mixture at no time decreases below a moderate level. The light yellow polymer has an I.V. of 0.50 and gives a very tough pressed film. NMR analysis indicates the molar ratio of ethyleneoxy/bisphenol A units is 0.96/1. Gas chromatographic analysis indicates the poly(ether-carbonate) contains the following:

| Diol Moiety | Mole % |
|---|---|
| HO–⟨⟩–⟨⟩–OH | 42.0 |
| HO–⟨⟩–⟨⟩–O—CH₂CH₂OH | 43.4 |
| HO—CH₂CH₂—O–⟨⟩–⟨⟩–O—CH₂CH₂OH | 14.6 |

EXAMPLE 3

This example illustrates the preparation of a poly(ether-carbonate) containing the maximum ratio of ethyleneoxy/bisphenol A units.

Into a 500-mL, three-necked flask equipped as described in Example 1 are placed 50.8 g (0.20 mol) bisphenol A polycarbonate and 35.2 g (0.40 mol) of cyclic ethylene carbonate. (Both starting materials are the same as those of Example 1.) After being purged and dried as described in Example 1, the flask is heated with stirring at 245° C. for 200 minutes to liberate 0.347 ft$^3$, or 0.39 mol of $CO_2$. At this time, vacuum is applied at 245° C. to <0.5 torr during about 35 minutes and heating is continued for 30 minutes and stopped. The light yellow, transparent polymer has an I.V. of 0.59 and gives a tough pressed film. NMR analysis indicates the molar ratio of ethyleneoxy/bisphenol A units in the polymer is 1.9/1.

EXAMPLE 4

This example illustrates the simultaneous preparation and foam molding of a poly(ether-carbonate) from ethylene carbonate/bisphenol A polycarbonate at a 0.014/1 molar ratio.

Into a vacuum oven are placed 564.7 g (2.223 mol) of bisphenol A polycarbonate pellets, I.V. 0.64. The polycarbonate pellets are then vacuum dried at 70° C./45 hours/<0.5 torr and transferred while hot to a glass bottle (preheated to about 75° C.). At this time, 2.84 g (0.032 mol) of freshly distilled, granular cyclic ethylene carbonate are added to the warm bottle; the bottle is capped under nitrogen; and the bottle is shaken and tumbled vigorously for 5–10 minutes to effect mixing (melt coating) of the ethylene carbonate with the polycarbonate. The molar ratio of ethylene carbonate/polycarbonate is 0.014/1. The blend is then injection foam molded at 300° C. and one minute cycle time by the "short-shot" method into ½ × ½ × 5-inch bars in a water-cooled mold in a Newbury molding machine. The bars are very slightly yellow and contain a substantial amount of small-cell foam structure. The bars have an I.V. of 0.58, and the density as measured by a null pycnometer is 0.710, which indicates a density reduction of 41%.

EXAMPLE 5

This example illustrates the preparation of a poly(ether-carbonate) from an aromatic diol polycarbonate in which both hydroxyl groups of the diol are on the same ring.

Into a 250-mL, single-necked flask equipped as described in Example 1 are placed 15.9 g (0.075 mol) 2-phenylhydroquinone polycarbonate, I.V. 0.59, and 6.6 g (0.075 mol) of distilled cyclic ethylene carbonate. After being purged and dried as described in Example 1, the flask is immersed in a metal bath maintained at 250° C. and slowly stirred for 60 minutes. During this time, the reaction mixture becomes homogeneous, a yellow color forms in the reaction mixture, and 0.013 ft$^3$ of gas are liberated. The metal bath temperature is then raised to 260° C. for 100 minutes and finally to 275° C. for 166 minutes. At this time, the total of liberated gas is 0.053 (0.059 mol of $CO_2$) and vacuum is applied during six minutes to <0.5 torr. The flask is slowly stirred under these conditions for an additional 18 minutes and cooled. The poly(ether-carbonate) has an I.V. of 0.50 and gives a clear, tough pressed film. NMR analysis indicates the molar ratio of ethyleneoxy/phenylhydroquinone units in the poly(ether-carbonate) is 0.78/1.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A composition of matter comprising a mixture of the following repeating units:

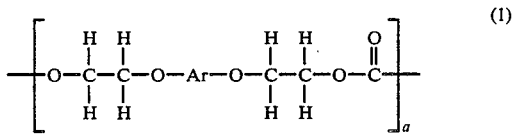

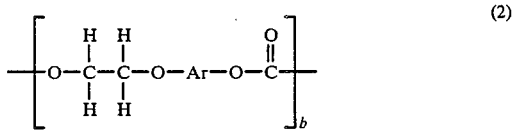

and

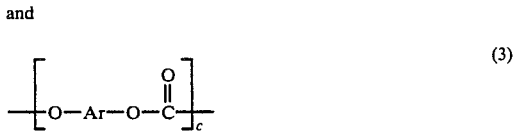

wherein a, b, and c are each integers of a magnitude such as to result in an inherent viscosity of about 0.05–2.00 of said composition determined at 25° C. in a 40/36/24 percent by weight mixture of p-chlorophenol/phenol/1,1,2,2-tetrachloroethane at a concentration of 0.1 g/100 mL, and Ar is aryl having 6–30 carbon atoms.

2. A foamed structure comprising the composition of claim 1.

3. A film comprising the composition of claim 1.

4. A fiber comprising the composition of claim 1.

* * * * *